United States Patent
Mizuno et al.

(10) Patent No.: US 9,238,327 B2
(45) Date of Patent: Jan. 19, 2016

(54) FILM FOR REINFORCING ELECTROLYTE MEMBRANE OF POLYMER ELECTROLYTE FUEL CELL

(75) Inventors: Naomi Mizuno, Anpachi-gun (JP); Mitsumasa Ono, Anpachi-gun (JP); Tetsuo Yoshida, Anpachi-gun (JP)

(73) Assignee: TEIJIN LIMITED, Osaka (JP)

( * ) Notice: Subject to any disclaimer, the term of this patent is extended or adjusted under 35 U.S.C. 154(b) by 713 days.

(21) Appl. No.: 12/934,019

(22) PCT Filed: Mar. 25, 2009

(86) PCT No.: PCT/JP2009/055886
§ 371 (c)(1),
(2), (4) Date: Sep. 22, 2010

(87) PCT Pub. No.: WO2009/119628
PCT Pub. Date: Oct. 1, 2009

(65) Prior Publication Data
US 2011/0020730 A1    Jan. 27, 2011

(30) Foreign Application Priority Data
Mar. 26, 2008   (JP) ................................. 2008-080457

(51) Int. Cl.
*H01M 8/02* (2006.01)
*B29C 55/12* (2006.01)
*B01D 69/10* (2006.01)
*B29C 55/14* (2006.01)
*C08J 5/18* (2006.01)
*C08J 5/22* (2006.01)
*B29K 25/00* (2006.01)
*H01M 8/10* (2006.01)

(52) U.S. Cl.
CPC ............... *B29C 55/12* (2013.01); *B01D 69/10* (2013.01); *B29C 55/143* (2013.01); *C08J 5/18* (2013.01); *C08J 5/2206* (2013.01); *H01M 8/0291* (2013.01); *B01D 2325/24* (2013.01); *B29K 2025/00* (2013.01); *C08J 2325/06* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

2009/0219672 A1*   9/2009  Masuda et al. ................ 361/502
2011/0172366 A1*   7/2011  Ishihara et al. ............... 525/240

FOREIGN PATENT DOCUMENTS

| EP | 1 712 592 A1 | 10/2006 |
|---|---|---|
| JP | 62-187708 A | 8/1987 |
| JP | 7-065847 A | 3/1995 |
| JP | 10-199551 A | 7/1998 |
| JP | 2007-103170 A | 4/2007 |
| JP | 2007-250249 A | 9/2007 |
| JP | 2007-335264 A | 12/2007 |
| WO | 2006/019029 A1 | 2/2006 |
| WO | 2007/010039 A1 | 1/2007 |
| WO | 2008/123261 A1 | 10/2008 |

OTHER PUBLICATIONS

European Search Report for corresponding Application 09725124.3-2119/2264087 PCT/JP2009055886 dated Aug. 1, 2012.

* cited by examiner

*Primary Examiner* — Ula C Ruddock
*Assistant Examiner* — Frank Chernow
(74) *Attorney, Agent, or Firm* — Sughrue Mion, PLLC

(57) ABSTRACT

An object of the present invention is to provide a biaxially oriented film suitable as a reinforcing member for an electrolyte membrane of a polymer electrolyte fuel cell, the film having excellent hot water resistance in a high-temperature and high-humidity use environment and being capable of maintaining the reinforcing effect for a prolonged period of time. The invention resides in a biaxially oriented film for reinforcing an electrolyte membrane of a polymer electrolyte fuel cell, the film being characterized in that the film (i) contains syndiotactic polystyrene as a major component and (ii) has a Young's modulus in at least one of the machine direction and the transverse direction ranging from 4,500 to 8,000 MPa.

7 Claims, No Drawings

FILM FOR REINFORCING ELECTROLYTE MEMBRANE OF POLYMER ELECTROLYTE FUEL CELL

TECHNICAL FIELD

The present invention relates to a biaxially oriented film suitable as a reinforcing member for an electrolyte membrane of a polymer electrolyte fuel cell (which may be hereinafter referred to as PEFC). More specifically, it relates to a biaxially oriented film suitable as a reinforcing member for an electrolyte membrane of a polymer electrolyte fuel cell, the film being excellent in hot water resistance and mechanical strength.

BACKGROUND ART

In recent years, fuel cells being actively developed in consideration of environmental issues. Various kinds of fuel cells have been known and are classified depending on the kind of the electrolyte used into a polymer electrolyte type, a phosphoric acid type, a fused carbonate salt type, a solid oxide type and the like. Among these, a polymer electrolyte fuel cell (PEFC) is developed for such purposes as a small-size power supply for home use, a portable power supply and a power supply for a movable body, owing to the relatively low reaction temperature and the electrolyte capable of being fixed conveniently, and in particular is actively developed for a purpose relating to automobiles.

PEFC is a fuel cell utilizing such a phenomenon that a polymer membrane having a proton (hydrogen ion) exchange group in the molecule thereof functions as a proton conductive electrolyte when impregnated with water to the saturated state. PEFC is constituted by a polymer electrolyte membrane containing a polymer ion exchange membrane (a cation exchange membrane), and a membrane-electrode assembly (fuel cell) having an anode and a cathode disposed on both sides of the electrolyte, which are held with a separator. A fuel gas, such as hydrogen, supplied to the anode is ionized to hydrogen ion on the catalytic electrode and migrates toward the cathode through the polymer electrolyte membrane, which is appropriately moistened. Electrons generated in that process are taken out to an external circuit and utilized as direct current energy. An oxidant gas, such as oxygen or air, is supplied to the cathode, and the hydrogen ion and the electrons are reacted with oxygen on the cathode to form water.

As the polymer electrolyte membrane, a perfluorosulfonic acid resin membrane (for example, "Nafion", a trade name, available from DuPont Corporation) has been used, and the cell is generally operated under a temperature condition of approximately 50 to 100° C. for decreasing the resistivity of the polymer electrolyte membrane to provide a high electric power generation efficiency. The polymer electrolyte membrane is demanded to have enhanced electroconductivity and reduced cost, and is difficult to handle since it is a material in an extremely thin film shape.

Accordingly, the polymer electrolyte membrane often gets wrinkled in the outer periphery upon assembling the film with an electrode and upon fabricating a stack by accumulating plural single cells. Furthermore, even in a state free of wrinkles, the polymer electrolyte membrane has a problem since it has the lowest mechanical strength among the constitutional members of the stack. PEFC is permanently tightened up, for example, for preventing from gas leakage and reducing the electric contact resistance among the constitutional member. It has been pointed out that the pressure of the tightening tends to deteriorate particularly the polymer electrolyte membrane with the lapse of time, which brings about reduction in durability of the cell.

JP-A-7-65847 (Patent Document 1) proposes a reinforcing flame that reinforces an electrolyte membrane mechanically and simultaneously prevents a fuel gas and an oxidant gas from leaking through the boundary surface with the electrolyte membrane. The reinforcing flame is preferably those having demanded mechanical strength, corrosion resistance and the like at the operation temperature, and the examples thereof disclosed are polycarbonate, polyethylene terephthalate, a glass fiber-reinforced epoxy resin, titanium and carbon.

JP-A-10-199551 (Patent Document 2) proposes the use of a flame member having gas tightness on an outer periphery of a porous member fixed to both surfaces of an electrolyte membrane. Examples of the material for the flame member disclosed are polycarbonate, a ethylene-propylene copolymer, polyester, modified polyphenylene oxide, polyphenylene sulfide, acrylonitrile-styrene, and the like.

JP-A-2007-103170 (Patent Document 3) proposes a biaxially oriented polyester film using polyethylene naphthalenedicarboxylate (which may be hereinafter referred to as a PEN film) as a reinforcing film for an electrolyte membrane. According to Patent Document 3, the use of the PEN film provides a flame member that has high mechanical strength, excellent thermal dimensional stability at the processing temperature range and the use temperature range, and excellent hydrolysis resistant property under the high humidity use environment.

JP-A-2007-250249 (Patent Document 4) proposes a seal-integrated membrane-electrode assembly used in a fuel cell, in which a reinforcing member having a higher rigidity than the seal member is provided inside the seal member. Examples of the resin for the reinforcing member disclosed are polyethylene naphthalate, polyethylene terephthalate, polyphenylene sulfide, polyether sulfone, polyether ether ketone, polyimide, polypropylene and polyimide.

As described above, various resins have been investigated mainly from the standpoint of mechanical strength as a reinforcing member for an electrolyte membrane of a polymer electrolyte fuel cell.

The reinforcing member is also being demanded to have long-term reliability, and such a material is demanded that not only has the reinforcing strength in the initial stage as in the conventional materials, but also maintains the mechanical strength over a prolonged period of time even under a high-temperature and high-humidity use environment.
Patent Document 1: JP-A-7-65847
Patent Document 2: JP-A-10-199551
Patent Document 3: JP-A-2007-103170
Patent Document 4: JP-A-2007-250249

DISCLOSURE OF THE INVENTION

Problems to be Solved by the Invention

An object of the invention is to provide such a biaxially oriented film suitable as a reinforcing member for an electrolyte membrane of a polymer electrolyte fuel cell that has excellent hot water resistance in a high-temperature and high-humidity use environment and is capable of maintaining the reinforcing effect for a prolonged period of time.

Another object of the invention is to provide such a reinforced electrolyte membrane for PEFC that has excellent hot water resistance and exhibits long-term reinforcing effect. Still another object of the invention is to provide such a membrane-electrode assembly (which may be hereinafter referred to as MEA) for PEFC that has excellent hot water resistance and exhibits long-term reinforcing effect.

Means for Solving the Problems

The objects of the invention are attained by a biaxially oriented film for reinforcing an electrolyte membrane of a polymer electrolyte fuel cell, the film being characterized in that the film (i) contains syndiotactic polystyrene as a major component and (ii) has a Young's modulus in at least one of the machine direction and the transverse direction ranging from 4,500 to 8,000 MPa.

The invention also includes the following embodiments.

Item 2. The film according to the item 1, wherein the film has a Young's modulus in at least one of the machine direction and the transverse direction of 3,800 MPa or more under a temperature atmosphere of 70° C.

Item 3. The film according to the item 1 or 2, wherein the film has a breaking strength holding ratio ($R^X$) represented by the following expression (1) in the main orientation axis direction of 50% or more.

$$R^X(\%)=(X/X_0)\times 100 \qquad (1)$$

(in the expression (1), X represents a breaking strength (unit: MPa) after processing under conditions of 121° C., 2 atm and 100% RH for 300 hours; $X_0$ represents an initial breaking strength (unit: MPa) before processing; and $R^X$ represents the breaking strength holding ratio (%)).

Item 4. The film according to any one of the items 1 to 3, wherein the syndiotactic polystyrene constituting the film has a weight average molecular weight ranging from $1.0\times10^5$ to $3.0\times10^6$.

Item 5. The film according to any one of the items 1 to 4, wherein the content of the syndiotactic polystyrene ranges from 60 to 100% by weight based on the weight of polymers constituting the film.

Item 6. The film according to any one of the items 1 to 5, wherein the syndiotactic polystyrene is copolymer syndiotactic polystyrene containing a copolymer component in an amount ranging from 0.1 to 10% by mol.

Item 7. The film according to any one of the items 1 to 6, wherein the film has a thickness ranging from 5 to 300 μm.

Item 8. The film according to any one of the items 1 to 7, wherein the film contains a polyester resin in an amount ranging from 0.01 to 40% by weight based on the weight of polymers constituting the film.

Item 9. The film according to the item 8, wherein the polyester resin is polyethylene naphthalenedicarboxylate.

Item 10. The film according to any one of the items 1 to 9, wherein the polymer electrolyte fuel cell is for a movable body.

Item 11. The film according to the item 10, wherein the movable body is an automobile.

Item 12. A reinforcing member for an electrolyte membrane of a polymer electrolyte fuel cell, the reinforcing member containing the film according to any one of the items 1 to 11.

Item 13. A reinforced electrolyte membrane for a polymer electrolyte fuel cell, the reinforced electrolyte membrane containing an electrolyte membrane and at least one biaxially oriented film in a flame shape, the film in a flame shape (i) containing syndiotactic polystyrene as a major component and (ii) having a Young's modulus in at least one of the machine direction and the transverse direction ranging from 4,500 to 8,000 MPa.

Item 14. A membrane-electrode assembly for a polymer electrolyte fuel cell, the membrane-electrode assembly containing an electrolyte membrane, a flame containing at least one biaxially oriented film in a flame shape, an anode and a cathode, the anode and the cathode facing each other with the electrolyte membrane intervening therebetween inside the flame, the film in a flame shape (i) containing syndiotactic polystyrene as a major component and (ii) having a Young's modulus in at least one of the machine direction and the transverse direction ranging from 4,500 to 8,000 MPa.

Item 15. Use of a biaxially oriented film (i) containing syndiotactic polystyrene as a major component and (ii) having a Young's modulus in at least one of the machine direction and the transverse direction ranging from 4,500 to 8,000 MPa as a reinforcing member for an electrolyte membrane of a polymer electrolyte fuel cell.

It has been found in the invention that the use of a biaxially oriented film containing syndiotactic polystyrene as a major component and having a Young's modulus of a certain value or more as a reinforcing member for an electrolyte membrane of a polymer electrolyte fuel cell exhibits considerably high hot water resistance and maintains the mechanical strength for a prolonged period of time under high-temperature and high-humidity use environment, and thus the invention has been completed.

Advantage Of The Invention

The biaxially oriented film of the invention has excellent hot water resistance and maintains the mechanical strength for a prolonged period of time, and thus maintains a sufficient reinforcing effect as a reinforcing member for a polymer electrolyte membrane demanded to have long-term reliability.

BEST MODE FOR CARRYING OUT THE INVENTION

The invention will be described in detail below.
<Syndiotactic Polystyrene>

The film of the invention contains syndiotactic polystyrene as a major component. Syndiotactic polystyrene has not only high hydrolysis resistant property but also excellent heat resistance, and when having a certain Young's modulus, maintains the reinforcing effect as a reinforcing member of a polymer electrolyte membrane for a prolonged period of time even under a high-temperature and high-humidity use environment.

The content of the syndiotactic polystyrene preferably ranges from 60 to 100% by weight, more preferably ranges from 90 to 100% by weight, further preferably ranges from 95 to 100% by weight, and particularly preferably 98 to 100% by weight, based on the weight of the polymers constituting the film. In the case where the content of the syndiotactic polystyrene is in the range, further excellent hot water resistance is obtained, and a larger content of the syndiotactic polystyrene provides higher hot water resistance characteristics.

The syndiotactic polystyrene in the invention means polystyrene that has a syndiotactic structure as a stereochemical structure, and is used as a generic term for polystyrene polymers having a syndiotactic structure.

The tacticity is generally measured by a nuclear magnetic resonance method with isotopic carbon ($^{13}$C-NMR method), and is expressed by the proportion of the successive plural constitutional units, for example, diad for two units, triad for three units, and pentad for five units. The syndiotactic polystyrene in the invention is polystyrene having a tacticity of 75% or more, and preferably 85% or more in terms of diad, and 30% or more, and preferably 50% or more in terms of pentad.

Examples of the syndiotactic polystyrene include polystyrene, poly(alkylstyrene), poly(halogenated styrene), poly(alkoxystyrene), poly(phenylstyrene), poly(vinylstyrene) and poly(vinylnaphthalene), each of which have a syndiotactic structure, a polymer obtained by partially hydrogenating the benzene ring of these polymers, a mixture of these polymers, and a copolymer containing the constitutional units.

Examples of the poly(alkylstyrene) include poly(methylstyrene), poly(ethylstyrene), poly(propylstyrene) and poly(butylstyrene).

Examples of the poly(halogenated styrene) include poly(chlorostyrene), poly(bromostyrene) and poly(fluorostyrene).

Examples of the poly(alkoxystyrene) include poly(methoxystyrene) and poly(ethoxystyrene).

Preferred examples among these include polystyrene, poly(p-methylstyrene), poly(m-methylstyrene) and poly(p-tert-butylstyrene), each of which have a syndiotactic structure.

The copolymer component of the copolymer syndiotactic polystyrene is preferably ranging from 0.1 to 10% by mol based on the total repeating units. The lower limit of the copolymer component is preferably 1% by mol, more preferably 3% by mol, and particularly preferably 5% by mol.

The use of the copolymer syndiotactic polystyrene that has a copolymer component in the aforementioned range enhances the film forming property and the molding workability of the resulting film.

The syndiotactic polystyrene in the invention preferably has a weight average molecular weight of $1.0 \times 10^4$ or more. The weight average molecular weight of the syndiotactic polystyrene more preferably ranges from $1.0 \times 10^5$ to $3.0 \times 10^6$, more preferably ranges from $2.0 \times 10^5$ to $1.0 \times 10^6$, and particularly preferably ranges from $2.2 \times 10^5$ to $5.0 \times 10^5$.

In the case where the weight average molecular weight of the syndiotactic polystyrene is less than $1.0 \times 10^5$, the film may be insufficient in flexibility (deformability) upon warping the film, the film is liable to suffer cracking upon passing through a pre-heating roller or a transporting roller of a film forming machine, and the film forming property may be insufficient on forming a thin film since the film may be broken during stretching due to flapping and vibration.

The syndiotactic polystyrene having a higher weight average molecular weight within the range may provide a film enhanced in heat resistance and mechanical characteristics. A syndiotactic polystyrene film is liable to suffer decrease in strength in the thickness direction of the film by biaxial orientation. Accordingly, in the case where a syndiotactic polystyrene film having a low weight average molecular weight is used as a reinforcing member for an electrolyte membrane, lamellar cracks may occur along the film plane upon application of the tightening force, and thus the reinforcing effect and the gas sealing capability may be lowered. The lamellar cracks due to the tightening force are decreased when the weight average molecular weight of the syndiotactic polystyrene is increased, and are decreased when the thickness of the film is decreased. In the case where the weight average molecular weight exceeds the upper limit, the film forming property may be deteriorated.

The syndiotactic polystyrene may be produced by a known method. For example, it can be produced by the method disclosed in JP-A-62-187708, in which a styrene monomer is polymerized in an inert hydrocarbon solvent or without a solvent in the presence of a condensation product of a titanium compound, water and an organic aluminum compound, particularly trialkylaluminum, as a catalyst.

The syndiotactic polystyrene in the invention may contain, depending on necessity, a known antioxidant, a known antistatic agent and the like in suitable amounts.

<Polyester Resin>

The film of the invention may further contain a polyester resin, and the content thereof preferably ranges from 0.01 to 40% by weight, more preferably ranges from 0.1 to 10% by weight, and further preferably ranges from 0.1 to 5% by weight, based on the weight of polymers constituting the film. The use of the polyester resin mixed increases the mechanical strength, such as the Young's modulus, thereby enhancing the reinforcing effect. The use of the polyester resin mixed may decrease the hot water resistance, on the other hand, and thus the content thereof is preferably as small as possible. In the case where the content of the polyester resin exceeds the upper limit, the film formation by stretching may be difficulty performed, or the hot water resistance may be decreased.

Examples of the polyester resin include an aromatic polyester resin, and specific examples of the dicarboxylic acid component thereof include terephthalic acid, isophthalic acid, naphthalenedicarboxylic acid, 4,4'-diphenyldicarboxylic acid and derivatives thereof. Specific examples of the diol component thereof include ethylene glycol, 1,4-butanediol, 1,4-cyclohexanedimethanol and 1,6-hexanediol. In view of the heat resistance, polyethylene naphthalenedicarboxylate is particularly preferred.

Examples of the naphthalenedicarboxylic acid constituting the polyethylene naphthalenedicarboxylate include 2,6-naphthalenedicarboxylic acid, 2,7-naphthalenedicarboxylic acid, 1,5-naphthalenedicarboxylic acid and derivatives thereof, and among these, polyethylene 2,6-naphthalenedicarboxylate using 2,6-naphthalenedicarboxylic acid as the dicarboxylic acid component is particularly preferred.

The polyester resin may be produced by a known method. For example, a dicarboxylic acid component and a glycol component are subjected to esterification reaction along with, depending on necessity, a copolymer component, and then the resulting reaction product is subjected to polycondensation reaction, thereby producing the polyester resin. Another method may also be used, in which derivatives of the raw material monomers are subjected to ester exchange reaction, and then the resulting reaction product is subjected to polycondensation reaction.

<Other Additives>

The biaxially oriented film of the invention may contain inert particles and the like in such a range that does not impair the advantages of the invention, for enhancing the handleability of the film. Examples of the inert particles include inorganic particles containing a Group IIA, IIB, IVA or IVB element in Periodic Table (such as kaolin, alumina, titanium oxide, calcium carbonate and silicon dioxide), and polymer particles having high heat resistance, such as a crosslinked silicone resin, crosslinked polystyrene and crosslinked acrylic resin particles. In the case where the inert particles are contained, the average particle diameter of the inert particles preferably ranges from 0.001 to 5 µm. The content of the inert particles preferably ranges from 0.01 to 10% by weight based on the total weight of the film.

The biaxially oriented film of the invention may contain, depending on necessity, small amounts of an ultraviolet ray absorbent, an antioxidant, an antistatic agent, a light stabilizer and a heat stabilizer.

<Young's Modulus>

The biaxially oriented film of the invention has a Young's modulus in at least one of the machine direction and the transverse direction ranging from 4,500 to 8,000 MPa. The film of the invention can exhibit, by having the elastic modulus, a sufficient reinforcing effect as a reinforcing member for an electrolyte membrane at an operation temperature. The machine direction referred herein means the continuous film forming direction in the production of the film, and may be referred to as a longitudinal direction or MD. The transverse direction referred herein means the direction perpendicular to the continuous film forming direction, and may be referred to as a widthwise direction or TD. The direction, in which the Young's modulus is 4,500 MPa or more, which is the higher Young's modulus, is referred to as the main orientation axis.

The lower limit of the Young's modulus is preferably 4,800 MPa, more preferably 5,000 MPa, and particularly preferably 5,500 MPa. The upper limit of the Young's modulus in at least one of the machine direction and the transverse direction is preferably 7,000 MPa, more preferably 6,500 MPa, and particularly preferably 6,000 MPa.

In the case where the Young's modulus is less than the lower limit, the reinforcing effect for an electrolyte membrane becomes insufficient, thereby deteriorating the handleability of the electrolyte membrane. Furthermore, the electrolyte membrane is liable to receive a load, thereby causing breakage of the electrolyte membrane, which brings about deterioration in durability of the cell. The Young's modulus is preferably higher within the range, but the upper limit thereof is naturally restricted since when the upper limit of the Young's modulus exceeds the range, the film is frequently broken in the film forming process due to the characteristics of the resin used.

Upon using as a reinforcing member for a polymer electrolyte membrane, the reinforcing effect thereof includes impact resistance, deformation resistance and pressure resistance on the film surface, and when the Young's modulus in at least one of the directions is in the range, the sufficient molecular orientation structure is formed to exhibits the characteristics.

In the case where the Young's modulus in at least one of the machine direction and the transverse direction is in the range, the Young's modulus in the other direction is not particularly limited and is preferably 3,500 MPa or more.

The aforementioned Young's modulus can be obtained by stretching the film by the range of the stretching ratio described in the film forming method.

The biaxially oriented film of the invention preferably has a Young's modulus in at least one of the machine direction and the transverse direction of 3,800 MPa or more under a temperature atmosphere of 70° C. The Young's modulus is more preferably 4,000 MPa or more, and further preferably 4,500 MPa or more. In the case where the Young's modulus in at least one of the directions under a temperature atmosphere of 70° C. is less than the lower limit, the film mounted on a movable body, such as an automobile, as a reinforcing member for an electrolyte membrane may be deformed due to vibration or impact and pressure of a fluid, such as gas or water, during operation at an operation temperature of the polymer electrolyte fuel cell (PEFC), i.e., a temperature ranging from 50 to 100° C. The deformation of the reinforcing member may fail to hold an electrolyte membrane thereby damaging the electrolyte membrane, and may impair the sealing condition with the sealing member, which cause failure in exhibiting a sufficient reinforcing effect. The Young's modulus is preferably higher within the range, but the upper limit thereof is naturally restricted due to the characteristics of the resin used and is 6,500 MPa or less.

The direction, in which the Young's modulus under a temperature atmosphere of 70° C. is exhibited, agrees with the direction, in which the Young's modulus of 4,500 MPa or more is exhibited at room temperature, i.e., the main orientation axis.

The Young's modulus under a temperature atmosphere of 70° C. can be controlled by the stretching ratio upon stretching, as similar to the Young's modulus at room temperature, and for attaining a Young's modulus of 3,800 MPa or more, the stretching in the direction of the Young's modulus is preferably 3.0 times or more. For attaining a Young's modulus of 4,000 MPa or more, the stretching in the direction of the Young's modulus is preferably 3.6 times or more. For attaining a Young's modulus of 4,500 MPa or more, the stretching in the direction of the Young's modulus is preferably 4.0 times or more. A higher Young's modulus is obtained with the same stretching ratio by using a polyester resin as a blended component.

<Hot Water Resistance>

The biaxially oriented film of the invention is used in a temperature range approximately ranging from 50 to 100° C. in a state where the film is in contact with a surface of an electrolyte membrane impregnated with water, and preferably suffers less decrease in strength due to hydrolysis under a high-temperature and high-humidity environment over a prolonged period of time. For attaining the property, the film of the invention preferably has a breaking strength holding ratio ($R^X$) represented by the following expression (1) in the main orientation axis direction of 50% or more.

$$R^X(\%) = (X/X_0) \times 100 \qquad (1)$$

In the expression (1), X represents a breaking strength (unit: MPa) after processing under conditions of 121° C., 2 atm and 100% RH for 300 hours; and $X_0$ represents an initial breaking strength (unit: MPa) before processing, and $R^X$ represents the breaking strength holding ratio (%).

The breaking strength holding ratio ($R^X$) represented by the expression (1) is preferably 70% or more, and further preferably 80% or more.

In the case where the breaking strength holding ratio ($R^X$) represented by the expression (1) is less than the lower limit, a mechanical strength sufficient as a reinforcing member may not be maintained for a prolonged period of time under a high-temperature and high-humidity use environment. The hot water resistance can be attained by using the syndiotactic polystyrene as a major component. A breaking strength holding ratio of 80% or more can be attained by making a content of the syndiotactic polystyrene of 90% by weight or more.

<Thickness of Film>

The biaxially oriented film of the invention preferably has a thickness ranging from 1 to 300 µm. The thickness of the film more preferably ranges from 5 to 300 µm. The lower limit of the thickness of the film is more preferably 10 µm. The upper limit of the thickness of the film is more preferably 250 µm, more preferably 150 µm, and particularly preferably 100 µm. In the case where the thickness of the film is less than the lower limit, a reinforcing effect sufficient as a reinforcing member for an electrolyte membrane may not be obtained. A film having a thickness exceeding the upper limit is difficult to produce with the syndiotactic polystyrene film. In the case where the thickness exceeds the upper limit, the size of the cell may be difficult to be reduced.

<Film Forming Method>

The film of the invention is necessarily biaxially oriented. The biaxially orientation makes the characteristics, such as the mechanical strength, favorable, and thus the film can exhibit a capability sufficient as a reinforcing member for a polymer electrolyte membrane.

The biaxially oriented film of the invention may be produced by any known film forming method that is capable of performing biaxially stretching, and for example, can be produced in such a manner that syndiotactic polystyrene having been sufficiently dried is melt-extruded at a temperature ranging from the melting point to (melting point+70)° C. and quenched on a casting drum to produce an unstretched film, and then the unstretched film is sequentially or simultaneously stretched biaxially, followed by being thermally fixed.

In the case where the film is produced by sequential biaxially stretching, the film is stretched by a ratio ranging from 3.0 to 6.0 times to make the Young's modulus in at least one of the machine direction and the transverse direction (the main orientation direction) of 4,500 MPa or more. The film is preferably stretched by a ratio ranging from 2.3 to 5.0 times in the direction perpendicular to the main orientation direction.

Upon making the Young's modulus at room temperature within the preferred range, the stretching ratio in the main orientation direction more preferably ranges from 4.0 to 4.8 times, and the stretching ratio in the direction perpendicular to the main orientation direction more preferably ranges from 2.5 to 4.0 times.

The stretching temperature in the machine direction preferably ranges from 100 to 140° C., and the stretching temperature in the transverse direction preferably ranges from 110 to 140° C.

The heat set is preferably performed at a temperature ranging from 200 to 260° C., and more preferably ranging from 220 to 240° C., under tension or under restricted contraction, and the heat set time preferably ranging from 1 to 1,000 seconds.

In the case of the simultaneous biaxially stretching, the aforementioned stretching temperature, stretching ratio, heat set temperature and the like may be applied. A relaxing treatment may be performed after the heat set.

In the case where polyester is contained as a component blended in the film, a prescribed amount of dried polyester chips are mixed with syndiotactic polystyrene chips, which are then put in a hopper, and thereafter, the chips are melt-extruded through an extruder and then subjected to stretching film formation, thereby providing the biaxially oriented film.

<Use>

The biaxially oriented film of the invention is a film for reinforcing an electrolyte membrane of a polymer electrolyte fuel cell (PEFC) with an operation temperature ranging approximately from 50 to 100° C., and is used as a reinforcing member of an electrolyte membrane. The biaxially oriented film of the invention can exhibit a reinforcing effect sufficient as a reinforcing member even as a thin film at the operation temperature under application of vibration, impact and tightening pressure.

Examples of the PEFC include a fuel cell for stationary use and a fuel cell for a movable body. In the use for a movable body, the film of the invention is preferably applied to PEFC for an automobile.

Accordingly, the invention includes a polymer electrolyte fuel cell (PEFC) containing the film.

<Reinforcing Member for Electrolyte>

The biaxially oriented film of the invention is preferably used as a reinforcing member for an electrolyte membrane of PEFC. The reinforcing member for an electrolyte membrane is preferably a member having a flame shape, which is disposed on an outer periphery of an electrolyte membrane. The reinforcing member in a flame shape may be produced by processing the film of the invention into such a flame-like shape that the center part where electrodes are accumulated is cut out into the shape of the electrodes, and the film remains only in the outer periphery. The reinforcing member for an electrolyte membrane includes the case where the member is constituted only by the biaxially oriented film of the invention, and also includes the case where another layer, such as an adhesive layer, is accumulated on at least one surface of the biaxially oriented film of the invention. For enhancing the adhesiveness between an electrolyte membrane and the biaxially oriented film of the invention, the surface of the film may be subjected to a corona treatment, a plasma treatment or the like.

The reinforcing member for an electrolyte membrane may be used by adhering at least one sheet of the biaxially oriented film to the outer periphery of the electrolyte membrane.

The reinforcing member for an electrolyte membrane is preferably used by adhering at least two sheets of the biaxially oriented films. Specific examples thereof include such an embodiment that one sheet of the biaxially oriented film is adhered on each of both surfaces of an electrolyte membrane, thereby holding the outer periphery of the electrolyte membrane. Two or more sheets of the biaxially oriented films may be adhered on each of both surfaces of the outer periphery of the electrolyte membrane.

<Reinforced Electrolyte Membrane>

The invention includes a reinforced electrolyte membrane for PEFC, containing an electrolyte membrane and at least one sheet of the biaxially oriented film in a frame shape.

The reinforced electrolyte membrane for PEFC preferably contains an electrolyte membrane and two sheets of the biaxially oriented films in a flame shape facing each other with the electrolyte membrane intervening therebetween.

PEFC has electrode layers disposed on both sides of an electrolyte membrane, in which the electrode layers have a smaller size than the electrolyte membrane, and the biaxially oriented film in a frame shape of the invention is generally disposed to surround the outer circumference of the electrode layer.

In the reinforced electrolyte membrane of the invention, the film in a flame shape used as a reinforcing member is as described above. The film of the invention preferably has such a flame-like shape that the center part where electrodes are accumulated is cut out into the shape of the electrodes, and the film remains only in the outer periphery.

In the case where one sheet of the film in a flame shape is used, the electrolyte membrane is held only on one side thereof with the outer periphery of the electrolyte membrane held thereby.

In the case where two sheets of the films in a flame shape are used, the two films in a flame shape preferably hold the electrolyte membrane on both surfaces thereof with the outer periphery of the electrolyte membrane held thereby.

In the reinforced electrolyte membrane of the invention, the directions of at least two sheets of the biaxially oriented films superimposed on each other may be such a manner that the directions where the Young's modulus of the film is 4,500 MPa or more (i.e., the main orientation directions) are superimposed in the same direction, or such a manner that the main orientation directions are superimposed randomly. In particular, at least two sheets of the films are preferably superimposed in such a manner that the main orientation directions are perpendicular to each other. In the case where the films are superimposed to make the main orientation directions perpendicular to each other, such a reinforced electrolyte membrane can be obtained that has not only a high reinforcing effect in the plane direction, but also a high reinforcing effect exhibited upon receiving an impact from any direction.

In the reinforced electrolyte membrane of the invention, the electrolyte membrane preferably contains a perfluorosulfonic acid resin.

<Membrane-Electrode Assembly>

The invention includes a membrane-electrode assembly (MEA) for a polymer electrolyte fuel cell (PEFC), containing the film of the invention, an electrolyte membrane, an anode and a cathode.

The MEA of the invention contains an electrolyte membrane, a flame containing at least one sheet of the biaxially oriented film in a flame shape, an anode and a cathode, in which the anode and the cathode face each other with the electrolyte membrane intervening therebetween.

It is preferred that the MEA of the invention contains an electrolyte membrane, two flames each containing a sheet of the biaxially oriented films in a flame shape, an anode and a cathode, in which two sheets of the biaxially oriented films face each other with the electrolyte membrane intervening therebetween, and the anode and the cathode face each other with the electrolyte membrane intervening therebetween within the flames.

In the MEA of the invention, the film used as film in a flame shape is as described above. The film in a flame shape preferably has such a flame-like shape that the center part where electrodes are accumulated is cut out into the shape of the electrodes, and the film remains only in the outer periphery.

In the case where one sheet of the film in a flame shape is used, the electrolyte membrane is held only on one side thereof with the outer periphery of the electrolyte membrane held thereby.

In the case where two sheets of the films in a flame shape are used, the two films in a flame shape preferably hold the electrolyte membrane on both surfaces thereof with the outer periphery of the electrolyte membrane held thereby, and the directions of the two sheets of the films in a flame shape superimposed on each other are in accordance with the description for the reinforced electrolyte membrane.

A diffusion layer having a larger size than the electrode layer is disposed on the outer side of the electrode layer, and one of the surfaces of the film in a flame shape is in contact with the outer periphery of the electrolyte membrane, and the other of the surfaces thereof is in contact with the outer periphery of the diffusion layer.

In the MEA of the invention, the electrolyte membrane preferably contains a perfluorosulfonic acid resin.

The cathode (fuel electrode) is an electrode, on which a fuel, such as hydrogen and methanol, is decomposed into proton and electron. The cathode is preferably a carbon black carrier having being supported thereon a platinum catalyst or a ruthenium-platinum catalyst. The anode (air electrode) is an electrode, on which proton migrating from the electrolyte membrane and electron migrating through a lead wire are reacted with oxygen in the air to form water. The anode (air electrode) is preferably a carbon black carrier having been supported thereon a platinum catalyst.

EXAMPLE

The invention will be described in detail with reference to examples below, but the invention is not limited to the examples. The characteristic values were measured in the following manners. The parts and percentages in the examples are parts by weight and percentage by weight unless otherwise indicated.

(1) Young's Modulus (Room Temperature)

A test piece obtained by cutting a film to a length of 150 mm and a width of 10 mm was pulled with Tensilon UCT-100, produced by Orientec Co., Ltd., in a room controlled to a temperature of 20° C. and a humidity of 50% under conditions of a chuck distance of 100 mm, a pulling speed of 10 mm/min and a chart speed of 500 mm/min, and the Young's modulus was calculated from the tangent line at the initial point of the resulting load-elongation curve. The Young's modulus in the machine direction was obtained by measuring the film in the machine direction (MD), and the Young's modulus in the transverse direction was obtained by measuring the film in the transverse direction (TD). The measurement of the Young's modulus was performed 10 times, and an average value was used.

(2) Young's Modulus (70° C.)

The Young's modulus under a temperature atmosphere of 70° C. was obtained in such a manner that by using Autograph AG-X, produced by Shimadzu Corporation, a test piece and the chuck part of Autograph were placed in a chamber set to a temperature atmosphere of 70° C., and after allowing to stand for one minute, the test piece was pulled under conditions of a chuck distance of 100 mm, a pulling speed of 10 mm/min and a chart speed of 500 mm/min. The Young's modulus was calculated from the tangent line at the initial point of the resulting load-elongation curve. The test piece used had a length of 150 mm and a width of 10 mm, and the Young's modulus was obtained for each of the test piece where the longer edge is in the machine direction of the film and the test piece where the longer edge is in the transverse direction of the film. The measurement of the Young's modulus was performed 10 times, and an average value was used.

(3) Hot Water Resistance

A test piece in a strip shape obtained by cutting the film to a length of 150 mm and a width of 10 mm to make the main orientation direction in the measurement length was hung with a stainless steel clip inside an environment tester set to 121° C., 2 atm, and wet saturation mode at 100% RH. After processing the test piece for 300 hours, the test piece was taken out and measured for breaking strength. The measurement was performed five times, and an average value was obtained. The breaking strength holding ratio ($R^X$) after 300 hours represented by the following expression (1) was obtained for evaluating the hot water resistance. The measurement apparatus used was Tensilon UCT-100, produced by Orientec Co., Ltd., and the measurement was performed under the same measurement condition as the measurement of the Young's modulus at room temperature.

$$R^X(\%) = (X/X_0) \times 100 \quad (1)$$

(in the expression (1), X represents a breaking strength (unit: MPa) after processing under conditions of 121° C., 2 atm and 100% RH for 300 hours; $X_0$ represents the initial breaking strength (unit: MPa) before processing; and $R^X$ represents the breaking strength holding ratio (%))

(4) Weight Average Molecular Weight

A syndiotactic polystyrene polymer was dissolved in o-dichlorobenzene at 140° C. to make a 0.10% solution. The concentration herein is in terms of weight ratio of specimen/solvent.

The resulting solution was filtered with a sintered filter having a pore diameter of 1.0 μm to prepare a specimen to be analyzed. The apparatus used and the measurement conditions were as follows.

A calibration curve was prepared by using standard polystyrene, and the specimens were measured for molecular weight distribution curve and weight average molecular weight.

<Apparatus and Measurement Conditions>
Apparatus: Gel permeation chromatography, Alliance GPC 2000 (produced by Waters Corporation)
Separation column: TSKgel GMH6-HT×2+TSKgel GMH6-HTL×2 (inner diameter: 7.5 mm, length: 300 mm, produced by Tosoh Corporation)
Column temperature: 140° C.
Moving phase: o-dichlorobenzene
Flow rate: 1.0 mL/min
Detector: differential refractometer (RI)
Injection amount: 400 μL
Molecular weight calibration: monodisperse polystyrene (produced by Tosoh Corporation)

(5) Thickness of Film

The thickness of the film was measured with an electronic micrometer (K-312A, a trade name, produced by Anritsu Corporation) with a stylus pressure of 30 g.

(6) Evaluation of Reinforcing Function of Reinforcing Member (A)

As an electrolyte membrane, a perfluorosulfonic acid resin (Nafion 117, produced by DuPont Corporation) in a 100 mm square shape was used, on both surfaces of which the biaxially oriented films (outer circumference: 100 mm×100 mm, inner circumference: 80 mm×80 mm) were superimposed and adhered by heat press at 140° C.

The resulting structure of the electrolyte membrane and the reinforcing member was fixed to a vibration tester and scanned by 10 Hz, 55 Hz and 10 Hz in this order over 60 seconds with a vibration amplitude of 0.75 mm (longitudinal direction) under an atmosphere of 90° C., and the scanning operation was designated as one cycle. After performing 10 cycles, the electrolyte membrane was observed visually for changes, such as wrinkle, breakage and damage, and evaluated by the following standard.

good: Wrinkle, breakage and damage were not found in the electrolyte membrane, and thus the film was excellent in reinforcing function.

poor: At least one of wrinkle, breakage and damage was found in the electrolyte membrane, and thus the film was insufficient in reinforcing function.

(7) Evaluation of Reinforcing Function of Reinforcing Member (B)

The structure of the electrolyte membrane and the reinforcing member prepared by the method in the item (6) was placed in an environment tester set to 121° C., 2 atm, and wet saturation mode at 100% RH, and processed for 300 hours.

The specimen after processing was fixed to a vibration tester and scanned by 10 Hz, 55 Hz and 10 Hz in this order over 60 seconds with a vibration amplitude of 0.75 mm (longitudinal direction) under an atmosphere of 90° C., and the scanning operation was designated as one cycle. After performing 10 cycles, the electrolyte membrane was observed visually for changes, such as wrinkle, breakage and damage, and evaluated by the following standard.

good: Wrinkle, breakage and damage were not found in the electrolyte membrane, and thus the film was excellent in reinforcing function.

poor: At least one of wrinkle, breakage and damage was found in the electrolyte membrane, and thus the film was insufficient in reinforcing function.

Example 1

A syndiotactic polystyrene homopolymer (weight average molecular weight: $2.7 \times 10^5$) dried at 120° C. for 4 hours was fed to an extruder, melted at a melting temperature of 300° C., extruded from a die slit, and then solidified by quenching on a casting drum set at a surface temperature of 60° C., thereby preparing an unstretched film. The unstretched film was subjected to sequential biaxial stretching by stretching 3.2 times in the machine direction (continuous film forming direction) at 120° C. and then stretching 3.6 times in the transverse direction (width direction) at 125° C., and then subjected to a heat set treatment at 200° C., thereby providing a biaxially oriented film having a thickness of 25 μm. The characteristics of the resulting biaxially oriented film are shown in Table 1. The resulting biaxially oriented film was excellent in the Young's modulus in the transverse direction, which was 4,800 MPa, and in the evaluation of hot water resistance, in which the breaking strength holding ratio after 300 hours was 85%, and thus maintained the reinforcing function for a prolonged period of time.

By using a reinforced electrolyte membrane produced according to the measurement method (6), a cathode was disposed inside the film in a flame shape on one side of the reinforced electrolyte membrane, and an anode was disposed inside the film in a flame shape on the other side thereof, which were installed in a polymer electrolyte fuel cell and measured for cell performance. As a result, normal operation and cell performance were confirmed without occurrence of breakage of the electrolyte membrane.

Example 2

Dimethyl naphthalene-2,6-dicarboxylate and ethylene glycol were subjected to ester exchange reaction in the presence of manganese acetate by an ordinary method, to which triethyl phosphonoacetate was then added. Antimony trioxide was then added thereto, and polycondensation was performed by an ordinary method to provide a polyethylene 2,6-naphthalenedicarboxylate resin.

A biaxially oriented film was obtained by performing the same operation as in Example 1 except that the polymer material used was prepared in such a manner that 0.1% by weight of spherical silica having an average particle diameter of 0.3 μm was added to the polyethylene 2,6-naphthalenedicarboxylate resin (intrinsic viscosity: 0.62 dL/g), and after drying the mixture at 180° C. for 6 hours, the mixture was added to the syndiotactic polystyrene homopolymer (weight average molecular weight: $2.7 \times 10^5$) in an amount of 5% by weight based on the polymer. The characteristics of the resulting biaxially oriented film are shown in Table 1. The resulting biaxially oriented film was excellent in the Young's modulus in the transverse direction, which was 4,900 MPa, and in the evaluation of hot water resistance, in which the breaking strength holding ratio after 300 hours was 80%, and thus maintained the reinforcing function for a prolonged period of time.

Example 3

An unstretched film prepared in the same manner as in Example 1 was subjected to sequential biaxial stretching by stretching 4.5 times in the machine direction (continuous film forming direction) at 120° C. and then stretching 2.5 times in the transverse direction (width direction) at 125° C., and then subjected to a heat set treatment at 200° C., thereby providing a biaxially oriented film having a thickness of 25 μm. The characteristics of the resulting biaxially oriented film are shown in Table 1. The resulting biaxially oriented film was excellent in the Young's modulus in the machine direction, which was 5,600 MPa, and in the evaluation of hot water resistance, in which the breaking strength holding ratio after 300 hours was 85%, and thus maintained the reinforcing function for a prolonged period of time.

Example 4

An unstretched film prepared in the same manner as in Example 2 was subjected to sequential biaxial stretching by stretching 2.5 times in the machine direction (continuous film forming direction) at 120° C. and then stretching 4.5 times in the transverse direction (width direction) at 125° C., and then subjected to a heat set treatment at 200° C., thereby providing a biaxially oriented film having a thickness of 25 μm. The characteristics of the resulting biaxially oriented film are shown in Table 1. The resulting biaxially oriented film was excellent in the Young's modulus in the transverse direction, which was 5,700 MPa, and in the evaluation of hot water resistance, in which the breaking strength holding ratio after 300 hours was 85%, and thus maintained the reinforcing function for a prolonged period of time.

Example 5

A biaxially oriented film was obtained by performing the same operation as in Example 1 except that a syndiotactic polystyrene homopolymer having a different weight average molecular weight (weight average molecular weight: 2.3×$10^5$) was used. The characteristics of the resulting biaxially oriented film are shown in Table 1. The resulting biaxially oriented film was excellent in the Young's modulus in the transverse direction, which was 4,600 MPa, and in the evaluation of hot water resistance, in which the breaking strength holding ratio after 300 hours was 85%, and thus maintained the reinforcing function for a prolonged period of time.

Example 6

A biaxially oriented film was obtained by performing the same operation as in Example 1 except that copolymer syndiotactic polystyrene (Grade 42AE, produced by Idemitsu Kosan Co., Ltd., weight average molecular weight: 2.3×$10^5$) was used. The characteristics of the resulting biaxially oriented film are shown in Table 1. The resulting biaxially oriented film was excellent in the Young's modulus in the transverse direction, which was 4,700 MPa, and in the evaluation of hot water resistance, in which the breaking strength holding ratio after 300 hours was 85%, and thus maintained the reinforcing function for a prolonged period of time. The use of the copolymer syndiotactic polystyrene enhanced the film forming property.

Example 7

A biaxially oriented film was obtained by performing the same operation as in Example 6 except that copolymer syndiotactic polystyrene having a different weight average molecular weight (Grade 142AE, produced by Idemitsu Kosan Co., Ltd., weight average molecular weight: 2.0×$10^5$) was used. The characteristics of the resulting biaxially oriented film are shown in Table 1. The resulting biaxially oriented film was excellent in the Young's modulus in the transverse direction, which was 4,500 MPa, and in the evaluation of hot water resistance, in which the breaking strength holding ratio after 300 hours was 85%, and thus maintained the reinforcing function for a prolonged period of time.

Comparative Example 1

An unstretched film prepared in the same manner as in Example 1 was subjected to sequential biaxial stretching by stretching 2.0 times in the machine direction (continuous film forming direction) at 120° C. and then stretching 2.0 times in the transverse direction (width direction) at 125° C., and then subjected to a heat set treatment at 200° C., thereby providing a biaxially oriented film having a thickness of 25 μm. The characteristics of the resulting biaxially oriented film are shown in Table 1. The resulting biaxially oriented film had a Young's modulus of 3,000 MPa in both the machine direction and the transverse direction, and thus was insufficient in reinforcing effect while exhibiting excellent hot water resistance.

Comparative Example 2

0.1% by weight of spherical silica having an average particle diameter of 0.3 μm was added to a polyethylene 2,6-naphthalenedicarboxylate resin (intrinsic viscosity: 0.62 dL/g) prepared in the same manner as in Example 2, and after drying the mixture at 180° C. for 6 hours, the mixture was fed to an extruder heated to 300° C. and then solidified by quenching on a casting drum set at a surface temperature of 60° C., thereby preparing an unstretched film. The unstretched film was subjected to sequential biaxial stretching by stretching 3.2 times in the machine direction (continuous film forming direction) at 150° C. and then stretching 3.6 times in the transverse direction (width direction) at 145° C., and then subjected to a heat set treatment at 200° C., thereby providing a biaxially oriented film having a thickness of 25 μm. The characteristics of the resulting biaxially oriented film are shown in Table 1. The resulting biaxially oriented film had a high Young's modulus to provide an excellent initial reinforcing effect, but exhibited a low breaking strength holding ratio after 300 hours in the evaluation of hot water resistance, thereby failing to maintain the reinforcing function for a prolonged period of time.

TABLE 1

|  | Young's modulus | | Young's modulus at 70° C. Main orientation direction MPa | Hot water resistance Breaking strength holding ratio after 300 hr (%) | Evaluation of reinforcing function of reinforcing member (A) Initial | Evaluation of reinforcing function of reinforcing member (B) After processing 300 hr |
|---|---|---|---|---|---|---|
|  | Machine direction MPa | Transverse direction MPa |  |  |  |  |
| Example 1 | 4,500 | 4,800 | 4,200 | 85 | good | good |
| Example 2 | 4,600 | 4,900 | 4,300 | 80 | good | good |
| Example 3 | 5,600 | 3,700 | 4,900 | 85 | good | good |
| Example 4 | 3,700 | 5,700 | 5,000 | 85 | good | good |
| Example 5 | 4,200 | 4,600 | 4,000 | 85 | good | good |
| Example 6 | 4,500 | 4,700 | 4,100 | 85 | good | good |
| Example 7 | 4,300 | 4,500 | 4,000 | 85 | good | good |
| Comparative Example 1 | 3,000 | 3,000 | 2,600 | 85 | poor | poor |
| Comparative Example 2 | 6,300 | 7,200 | 4,500 | 35 | good | poor |

INDUSTRIAL APPLICABILITY

The biaxially oriented film of the invention has excellent hot water resistance in a high-temperature and high-humidity use environment and is capable of maintaining the reinforcing effect for a prolonged period of time, and thus can be favorably used as a reinforcing member for an electrolyte membrane of a polymer electrolyte fuel cell.

The invention claimed is:

1. A biaxially oriented film for reinforcing an electrolyte membrane of a polymer electrolyte fuel cell, the film being characterized in that the film
   (i) contains syndiotactic polystyrene as a major component, wherein the syndiotactic polystyrene is present in a content ranging from 95 to 100% by weight based on the weight of all polymers constituting the film, and
   (ii) has a Young's modulus in at least one of the machine direction and the transverse direction ranging from 4,500 to 8,000 MPa under a temperature atmosphere of 20° C.,
   wherein the film has a thickness ranging from 10 to 300μm.

2. The film according to claim 1, wherein the film has a breaking strength holding ratio ($R^X$) represented by the following expression (1) of 70% or more in a main orientation axis direction:

$$R^X(\%) = (X/X_0) \times 100 \quad (1)$$

(in the expression (1), X represents a breaking strength (unit: MPa) after processing under conditions of 121° C., 2 atm and 100% RH for 300 hours; $X_0$ represents an initial breaking strength (unit: MPa) before processing; and $R^X$ represents the breaking strength holding ratio (%)).

3. The film according to claim 1, wherein the syndiotactic polystyrene constituting the film has a weight average molecular weight ranging from $1.0 \times 10^5$ to $3.0 \times 10^6$.

4. The film according to claim 1, wherein the syndiotactic polystyrene is copolymer syndiotactic polystyrene containing a copolymer component in an amount ranging from 0.1 to 10% by mol.

5. The film according to claim 1, wherein the polymer electrolyte fuel cell is for a movable body.

6. The film according to claim 5, wherein the movable body is an automobile.

7. A reinforcing member for an electrolyte membrane of a polymer electrolyte fuel cell, the reinforcing member comprising the film according to claim 1.

* * * * *